INVENTORS
ROBERT L. SCHAUER &
HERBERT A. RENDEL
BY
ATTORNEYS

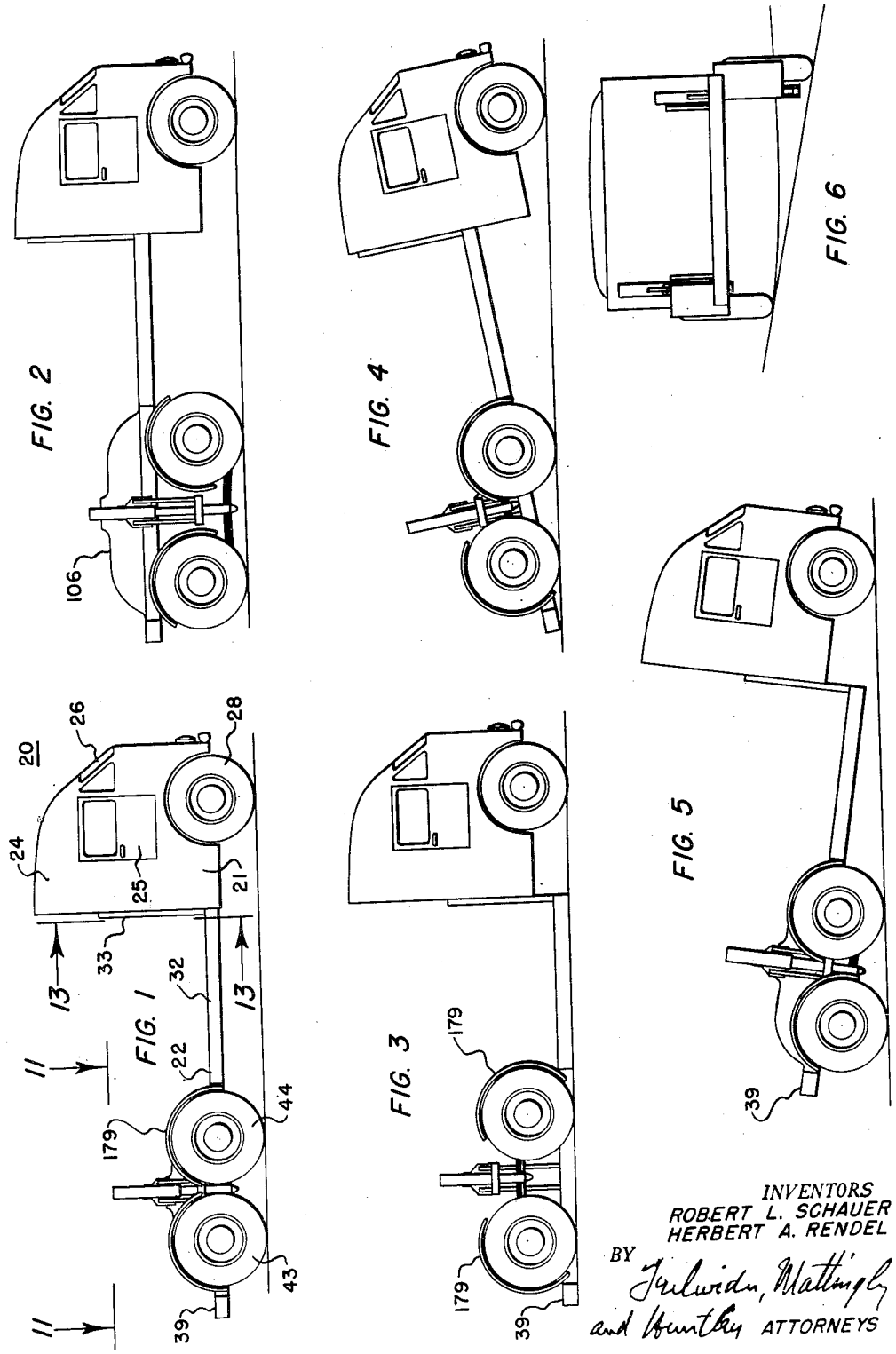

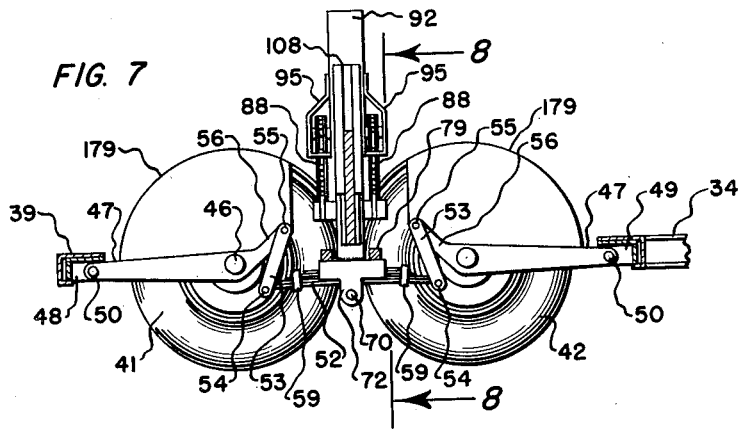
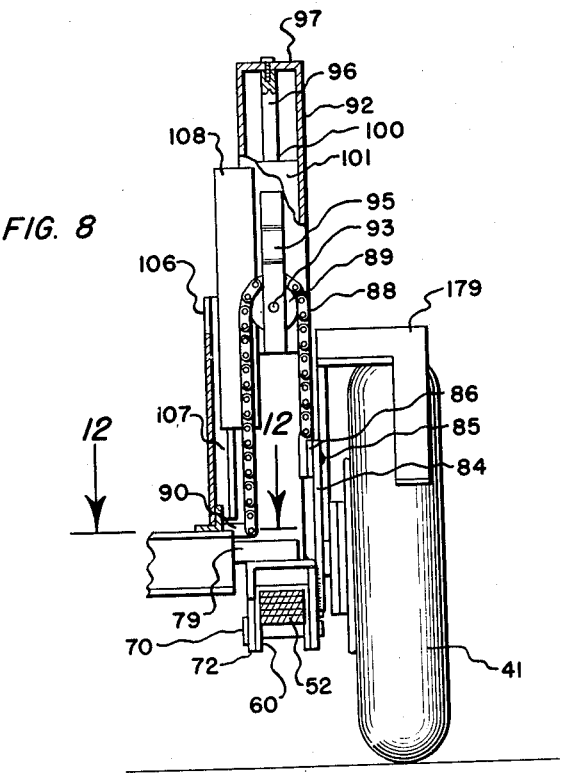

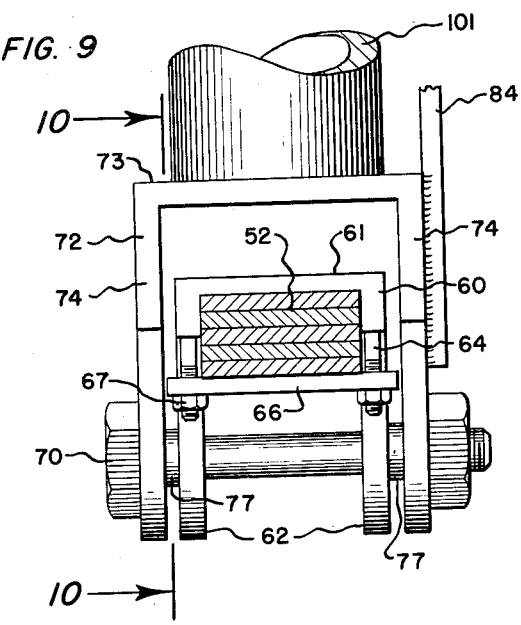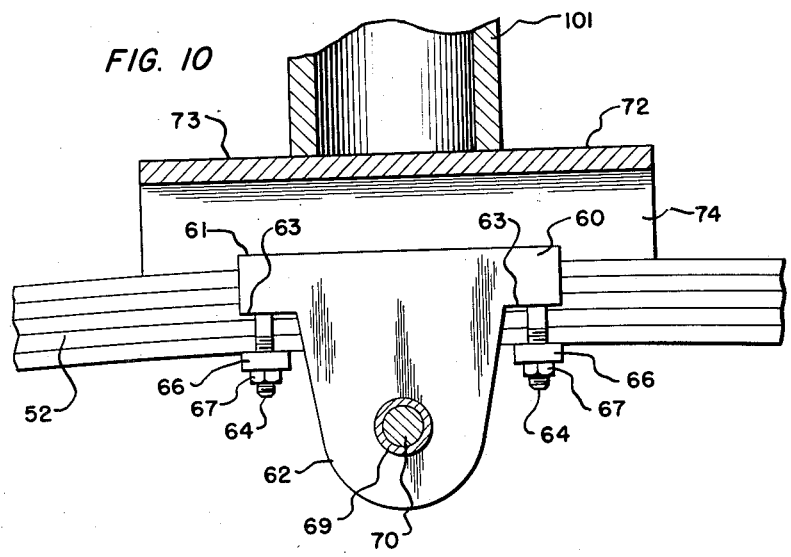

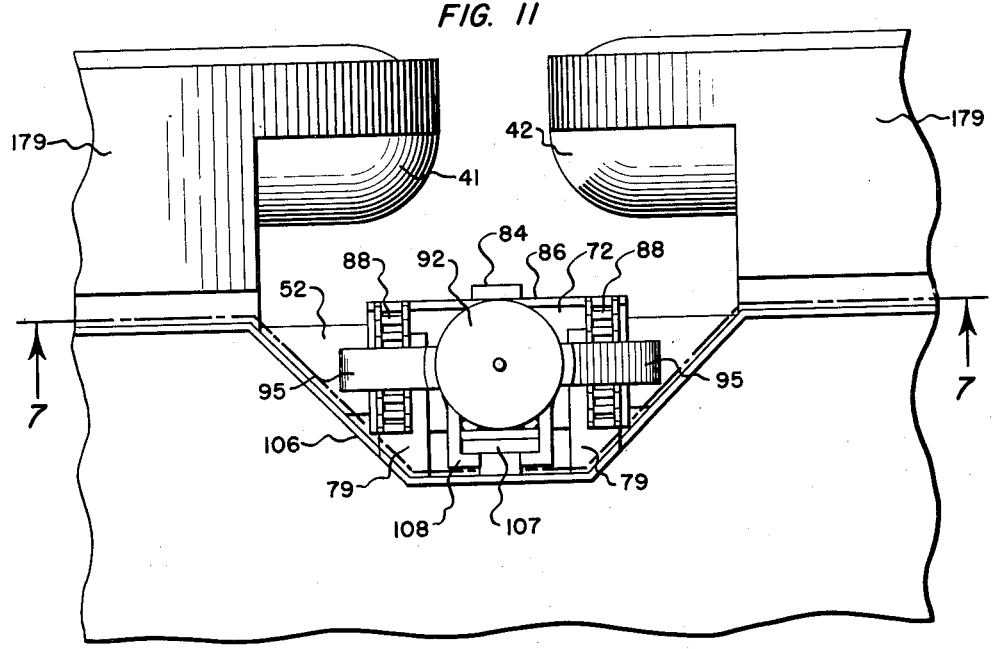
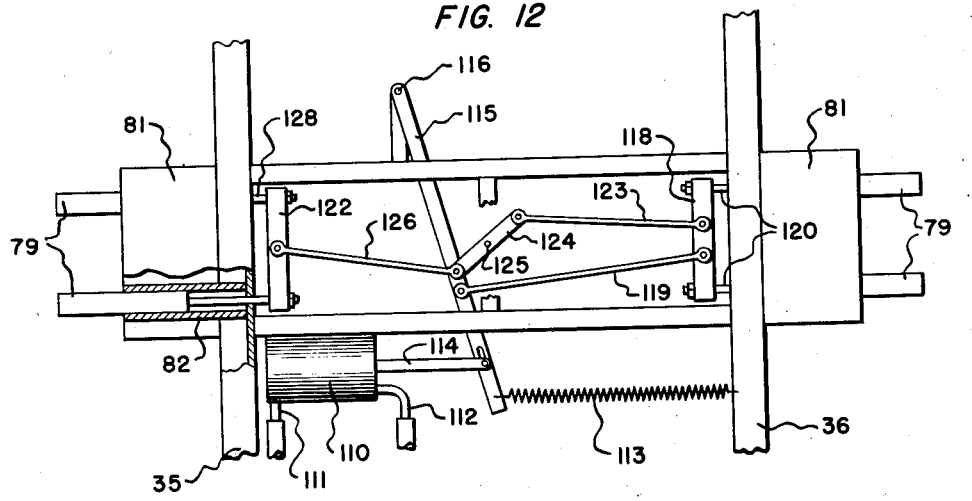

Dec. 18, 1956  H. A. RENDEL ET AL  2,774,604
TRUCKS OR OTHER TYPES OF VEHICLES FOR MOVING HEAVY MATERIAL
HAVING A VERTICALLY ADJUSTABLE LOAD CARRYING FRAME
Filed Feb. 18, 1955  6 Sheets-Sheet 6
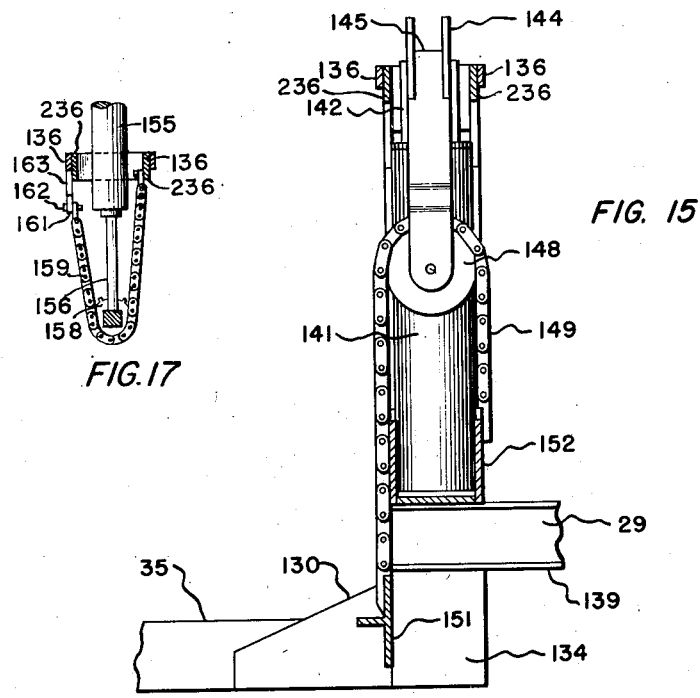
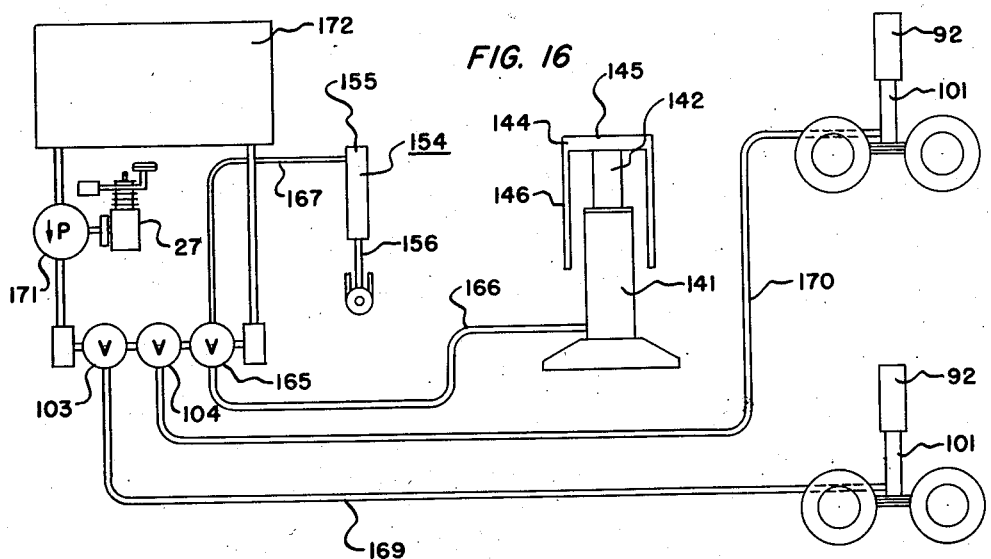
INVENTORS
ROBERT L. SCHAUER &
HERBERT A. RENDEL
BY
*Fulwider, Mattingly
and Huntley* ATTORNEYS

United States Patent Office 2,774,604
Patented Dec. 18, 1956

2,774,604

TRUCKS OR OTHER TYPES OF VEHICLES FOR MOVING HEAVY MATERIAL HAVING A VERTICALLY ADJUSTABLE LOAD CARRYING FRAME

Herbert A. Rendel and Robert L. Schauer, Lemon Grove, Calif.

Application February 18, 1955, Serial No. 489,248

14 Claims. (Cl. 280—6)

Our invention relates to trucks or other types of vehicles for moving material, such as as heavy units, packages, or pieces.

Generally, our invention comprehends the ready moving of the material-carrying frame to or from its normal "traveling" position and its various "loading" or "unloading" positions. The invention further comprehends, selectively, raising the entire material-carrying frame, lowering the entire frame, raising or lowering the entire rear end of the frame relative to the front end of the frame, raising or lowering the entire front end of the frame relative to the rear end thereof, raising or lowering either side of the rear end of the frame relative to the other side of the rear end of the frame, or simultaneously raising or lowering the front end of the frame while either side of the rear end of the frame is raised or lowered.

In carrying out our invention, we provide separate or independent axles for the wheels on opposite sides of the truck, i. e., these axles are connected with the truck frame independently of one another, whereby the distance between one side of the truck frame and the axle, on one side of the frame, can be varied relative to the distance between the axle and the frame, on the other side of the frame. And, we provide elevating means between the wheels and frame for, selectively, independently raising or lowering either side of the frame or raising and lowering both sides concomitantly.

In the preferred embodiment of the invention, the axles for the rear wheels of the truck are each connected with the frame through a lever and, preferably two wheels are provided on each side of the frame, each connected through its axle to the frame. The free ends of the levers, on one side of the truck, extend toward one another and are connected with one another by a spring, herein shown as a leaf spring. The frame is adapted to rest on these leaf springs (on opposite sides of the frame) while the frame is in "traveling" position. And, to this end, we provide retractable bars or fingers which are adapted to rest on the springs when in extended position, but can be retracted so as to permit raising or lowering of the truck frame relative to the wheels, to any of its various "loading" or "unloading" positions.

Further objects and advantages will be apparent from the following description, reference being had to the accompanying drawings wherein a preferred embodiment of the invention is illustrated.

In the drawings:

Fig. 1 is a side view of the improved vehicle showing the truck frame in "traveling" position;

Fig. 2 is a view similar to Fig. 1 but showing the truck frame in a dock "loading" or "unloading" position;

Fig. 3 shows the truck frame in its lowermost "loading" or "unloading" position;

Fig. 4 is a view showing only the rear end of the truck frame in its lowermost position;

Fig. 5 is a view showing the position of the truck frame when only the front end thereof is lowered;

Fig. 6 is a rear view showing the front of the truck resting on level ground but showing the rear of the truck braked on sloping ground, and showing how the relative position of one side of the frame can be changed with respect to the axle whereby the truck frame lies on a substantially horizontal plane;

Fig. 7 is a fragmentary view partly in section, the section being taken along lines 7—7 of Fig. 11, showing how the wheels are connected with the frame and showing part of the elevating mechanism for imparting relative movement between the frame and wheels;

Fig. 8 is a fragmentary sectional view taken on line 8—8 of Fig. 7;

Fig. 9 is a fragmentary detail view of the saddle and elevating cylinder shown partly in section and viewed in substantially the same plane as Fig. 8, but on a larger scale than Fig. 8;

Fig. 10 is a fragmentary view partly in section, the section being taken along line 10—10 of Fig. 9;

Fig. 11 is a fragmentary top plan view of the rear end of the truck looking in the direction of arrows 11 of Fig. 1;

Fig. 12 is a fragmentary view partly in section, the section being taken along line 12—12 of Fig. 8;

Fig. 15 is a view partly in section, the section being taken along line 15—15 of Fig. 13;

Fig. 16 is a diagrammatic view of the fluid-actuated elevating system; and

Fig. 17 is a section taken on line 17—17 through Fig. 13.

Figure 13:
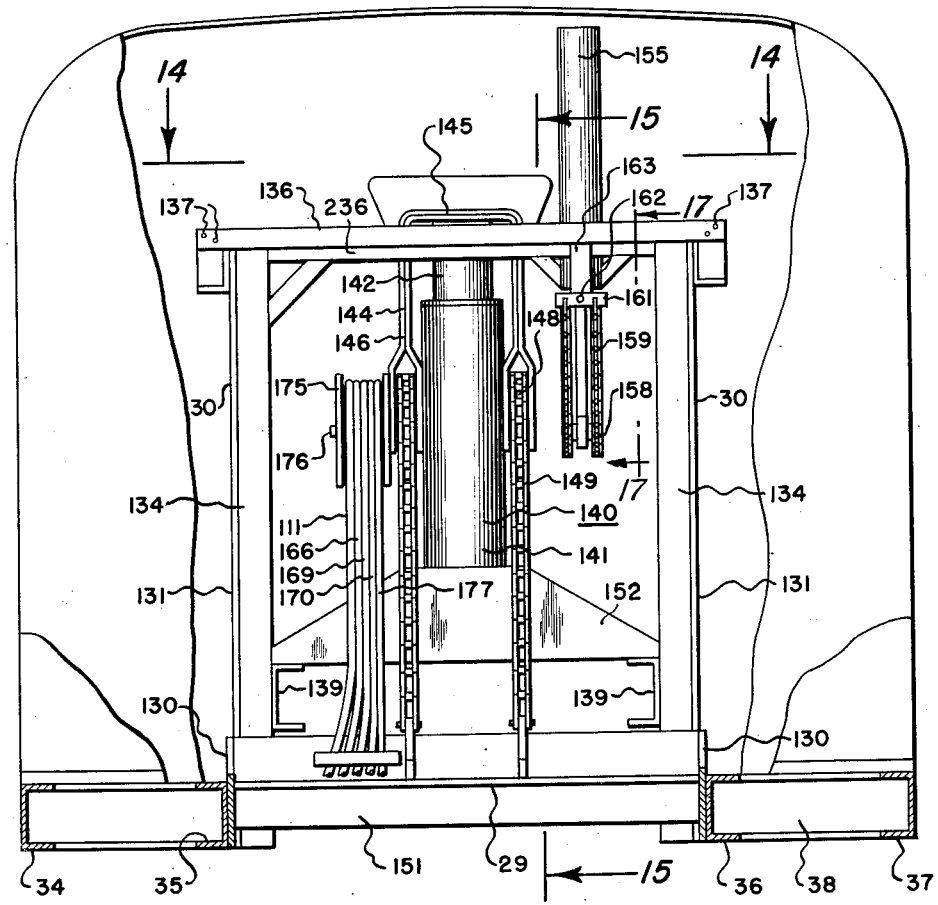
Fig. 13 is a fragmentary view partly in section, the section being taken along line 13—13 of Fig. 1.

Referring more in detail to the drawings, the vehicle, in the form of a truck 20, includes a front section 21 and a rear section 22. The front section includes a cab 24 having the usual doors 25 and windshield 26. The front section 21 also includes the motor 27 and transmission mechanism (not shown) for driving the two front wheels 28. Suitable mechanism (not shown) is provided for steering the wheels 28. Front section 21 also includes a horizontally-disposed main frame 29, which main frame includes an upright frame 30 at the extreme rear thereof. This main frame is formed of suitable channel irons, angle irons, and braces, as will be more fully explained hereinafter.

The rear section 22 includes a main material-carrying frame 32, which includes an upright section 33, the latter being supported in guiding relationship with the upright frame 30 of the front section, whereby the material-carrying frame 32 and front section frame 30 can be moved vertically relative to one another, as is generally shown in Figs. 1 to 5 inclusive. Frame 32 includes rearwardly-extending channel irons 34, 35, 36, and 37. The channel iron 34 provides the extreme left side of the material-carrying frame 32, while channel iron 37 provides the extreme right side of the material-carrying frame 32. Channel irons 35 and 36 are disposed intermediate irons 34 and 37, and form auxiliary supports for a platform on the frame. These channel irons are connected at the front with channel iron or channel irons 38 and by similar channel iron or channel irons 39 at the rear, thus forming an elongated rearwardly-extending truck frame.

The rear section 22 also includes a rear wheel or wheels. Preferably, at least one wheel is disposed on either side of the frame 32 and in the preferred embodiment illustrated, a pair of wheels is provided on each side. These wheels are indicated at 41, 42, 43, and 44. The pair of wheels 41 and 42 are disposed on the left side and the pair 43 and 44 are disposed on the right side of frame 32.

Each wheel on the frame 32 is so arranged that relative vertical movement can be imparted between the same so that, for example, while the wheels are resting on the ground, the frame 32 can be raised or lowered with respect to the ground level, all as is generally shown in Figs. 1 to 6 inclusive. To this end, each of the axles 46 for the wheels 41—44 is connected with the frame 32 by a lever 47. The levers 47 for the wheels 41 and 43 are connected to the extreme rear channel iron 39 by reenforcing iron 48, and the levers 47 for wheels 42 and 44 are connected to channel irons 34 and 37 by reenforcing irons 49. The pivots for the levers 47 are shown at 50. The free ends of the levers 47 for wheels 41 and 42 extend toward one another and likewise the free ends of the levers 47 for wheels 43 and 44 extend toward one another. Each of the pairs of wheels 41—42 and 43—44 is connected with one another through cushioning means 52 by links 53 and levers 47. The cushioning means is herein shown as leaf springs 52. These leaf springs are pivotally connected as at 54 with links 53, and the links 53 are in turn pivotally connected as at 55 with sections 56 of levers 47.

Standard types of clamps 59 are used for holding some of the leaves of the spring together in sliding relationship. At the center, the springs are held in place by a saddle 60. This saddle includes a yoke portion 61 and depending legs 62. The yoke portion lies above the uppermost leaf of spring 52 and the legs lie alongside of the side edges of the leaves. The legs 62 are provided with offset portions 63, and bolts 64 depend from these portions and lie alongside the lower leaves of spring 52. Four such bolts are provided and arranged in pairs, one bolt of each pair on opposite sides of the spring, and the springs are held in position by bars 66 which are clamped on the underside of the lower spring by nuts 67. The lower end of the legs 62 of the saddle 60 are provided with bushings 69 which receive a pin 70.

Each of the leaf springs 52 is also straddled by a second saddle 72. This saddle 72 includes a yoke portion 73 and depending legs 74, which lie alongside but are spaced from the legs 62. The lower ends of legs 74 carry bushings similar to the bushings 69 of the saddle 60 which also receive the pin 70. The legs 62 of saddle 60 are held in spaced relationship with the legs 74 of saddle 72 by washers 77. The pin 70 is held in position in any suitable manner. When the truck frame is in "traveling" position, it is supported on the springs 52 through pins 79. Pins 79 ride upon the yokes 73 of saddles 72 and saddles 72 are carried by the spring 52 through the pins 70 and saddles 60. These pins 79 are preferably square in cross section and are retractably carried by the frame of the truck.

Referring to Fig. 12, it will be seen that the sides of channel irons 35 and 36 carry sub-frame 81, which are suitably welded to channel irons 35 and 36, and these sub-frames 82 form sockets 82 which are square in cross section for retractably receiving the pins or fingers 79. A pair of these fingers 79 is provided on each side of the truck and is arranged, as previously stated, to rest on top of the yoke 73. Thus it will be seen that the truck frame is carried directly by the springs 52 when the pins 79 are in the position shown in Figs. 7 and 8. Each saddle 72 is pivotally supported on its respective pin 70, whereby the wheels 41—42 can move upwardly and downwardly independent of one another, the purpose being to permit such independent movement while these wheels are "traveling" over rough roads. It will be observed that there is a clearance provided between the upper part of saddle 60 and the lower part of saddle 72 to permit this relative movement of the spring with respect to the saddle 72. The pins 79 are extended and retracted by fluid power, as will be described hereinafter.

Referring particularly to Fig. 8, it will be seen that a bar 84 is suitably welded to the side of the outer leg 74 of the saddle 72. This bar extends upwardly and pivotally carries, as at 85, a cross bar 86. Chains 88 are attached to each end of the cross bar 86. These chains ride on sprockets 89 and the opposite ends of the chains are connected with the main frame of the truck, as at 90. The cross bar being pivotally mounted functions as an equalizing bar, so as to divide the stresses evenly between pairs of chains. Sprockets 89 are disposed on opposite sides of a sleeve 92. Each sprocket 89 is carried by a pin or shaft 93, one end of which is journaled in the sleeve 92, and the other end is journaled in a bracket 95 which is suitably welded to the side of sleeve 92. By raising and lowering the sleeve 92, the sprockets 89 are raised and lowered.

The sleeve 92 is raised and lowered through a ram 96, which is suitably attached to the head 97 of the sleeve 92. The fluid-pressure system, herein shown as a hydraulic motor 100, includes the ram 96 and cylinder 101. This ram 96 is connected with a suitable piston or plunger (not shown) disposed within the cylinder 101. The lower end of the cylinder 101 is welded directly to the top side of yoke 73 of saddle 72. Obviously, when fluid is injected into the lower end of the cylinder below the plunger, the plunger together with the ram 96 and sleeve 92 and sprockets 89 will be raised. Since, as viewed in Fig. 8, the right ends of chains 88 are held relatively stationary, the raising of the sprocket 89 will effect the lifting of that side of the truck frame on which the ram is extended. Preferably at this time the fingers 79 are retracted. The size and relationship of the parts heretofore described are such so as to effect the lifting of the truck frame to the standard dock "loading" height (shown in Fig. 2), that is, a height equal to the height which is usual for docks.

Obviously also, when the fluid is withdrawn from the cylinder 101, the sprockets 89 will be lowered, and since the pins 79 are retracted, the truck frame can be lowered so as to rest upon the floor or road, all as is more clearly shown in Fig. 3, and the dimensions hereinafter described being such as to permit such extent of lowering of the truck frame. It will be observed that as the truck frame is being lowered or raised, the wheels will pivot about the frame on their respective levers 47, and the variable distance through which they move from and toward one another is permitted by reason of the links 53.

It will be understood that a hydraulic motor 100 is provided for each pair of wheels on opposite sides of the truck. The hydraulic system is such that fluid may be forced into the cylinders concomitantly, or withdrawn from the cylinders concomitantly, by operating both valves 103 and 104 simultaneously, or the valves can be actuated independently to raise or lower only one side, raise one side and lower the other side. By lowering or raising the sides independently of one another, the truck can be positioned to compensate for an incline, as is shown in Fig. 6.

It is desirable to maintain perpendicular relationship between the truck bed and the wheels, such as 41—42, and the cylinder 101. For this purpose, each guide 106, lying alongside the sleeve 92, is provided on its outer side with an elongated and vertically-extending guide 107. This guide is T-shaped in vertical cross section, and the cross arms of the T extend into the opening of a vertically-extending elongated bracket 108, this bracket being C-shaped in vertical cross section and connected with sleeve 92.

The fluid-pressure system for actuating the fingers 79 may be either hydraulic or pneumatic; it is herein shown as pneumatic, and comprises a vacuum cylinder 110 which is connected by a flexible tube 111 to a source of partial vacuum. Air is permitted to flow to and escape from the opposite end of the cylinder through a pipe 112.

The fingers 79 are normally held in extended position through levers and links by spring 113.

The partial exhausting of the cylinder 110 through the flexible tube 111 will effect a movement of the ram 114 to the left, as viewed in Fig. 12. Ram 114, being connected to a lever 115 which is pivoted at 116, will effect movement of the lever 115 to the left. Movement of lever 115 to the left will effect movement of a bar 118 to the left through a link 119. Bar 118 is connected by bolts 120 to the pins 79 on the right side of the frame for moving said fingers to the retracted position. Bar 118 is connected to a like bar 122 on the opposite side of the frame by link 123, a lever 124 pivoted at 125, and a link 126. By this connection the bar 122 is moved to the right when bar 118 is moved to the left, and movement of bar 122 to the right will effect retraction of pins 79 on the left side of the frame through bolts 128.

Figure 14:
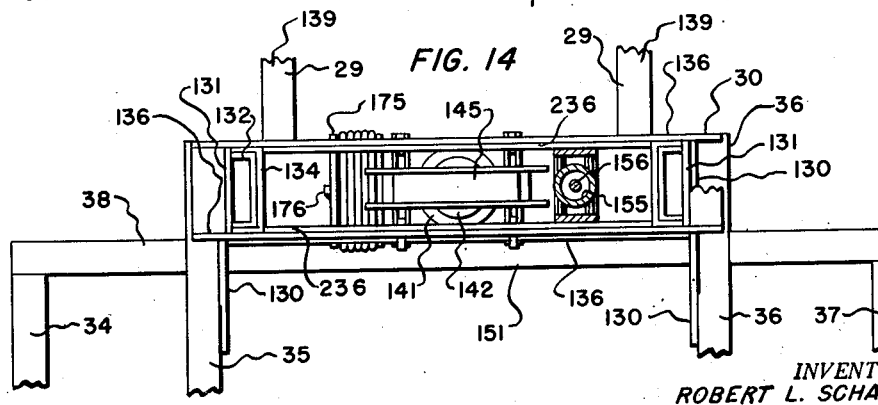
Fig. 14 is a view partly in section, the section being taken along line 14—14 of Fig. 13.

Referring now particularly to Figs. 13, 14, 15 and 17, it will be seen that the channel irons 35 and 36 carry forwardly-extending plates 130. These plates are suitably welded to the channel irons and the forward ends thereof are suitably welded to vertically-extending plates 131. Vertically-extending channel irons 132 have the ends of the legs thereof welded to the plates 131. These channel irons 132 are received by channel irons 134 of the front frame 30. The channel irons 132 and 134 are in sliding and thereby guiding relationship, whereby the material-carrying frame 32 can be moved vertically with respect to the front frame 30. The upper ends of the channel irons 132 are held in spaced relationship with one another by front and rear transverse bars 136, which are bolted in position by bolts 137 after the frames 32 and 30 are in assembled relationship. The lower ends of channel irons 134 are suitably welded to the longitudinally-extended channel irons 139 of the main frame 29, and their upper ends are connected by front and rear transverse bars 236.

The front end of the rear frame 32 is raised and lowered relative to the front frame 29 by a fluid-pressure mechanism, and preferably by a hydraulic motor 140 which includes the cylinder 141 and the ram 142. The bottom of cylinder 141 is suitably connected with the front frame 29 and extends vertically with the ram 142 protruding from the upper end thereof. A saddle 144, formed of two layers of strap iron, has its yoke portion 145 suitably fastened to the upper end of the ram 142 and is raised and lowered by the ram. The legs 146 of the saddle 144 extend downwardly alongside the ram and cylinder, and each carries a sprocket 148 for chains 149. One end of each of the chains 149 is connected to a T-shaped iron 151, suitably fastened to the rear frame 32 (see Fig. 15). The other ends are connected to the cross member 152 which is suitably welded to the channel irons 139 of the front frame 29. Cross member 152 also seats the cylinder 141.

We prefer to not depend upon weight of the rear frame for effecting the lowering of the front end of the rear frame and, therefore, provide a second fluid-pressure operated motor 154 which is herein also shown as a hydraulic motor, including a cylinder 155 and a ram 156. The cylinder 155 has its upper end suitably connected with the top portion of front frame 30 and the ram extends downwardly and carries two sprockets 158 for chains 159. One end of one of these chains is connected to an equalizing bar 161 on one side of the pivot 162 therefor, and one end of the other chain is connected to the equalizing bar at the other side of pivot 162. Bar 163 pivotally connects the equalizer bar 161 with rear transverse bar 136 of the vertically movable rear frame 32. The opposite ends of chains 159 are joined with front transverse bar 236 of the front frame, so that when ram 156 forces sprockets 158 downward, the chains will pull downward on rear transverse bar 136 and thereby drive the front end of the rear frame 32 downwardly. A valve 165 is employed for controlling the flow of fluid through flexible tube 166 which leads to and from cylinder 141, and flexible tube 167 which leads to and from cylinder 155.

When the valve 165 is in neutral position, the flow of fluid to and from cylinders 155 and 141 is shut off, whereby the rams 156 and 142 are locked in position. The motor 154 not only forces the front end of the rear frame downwardly but also prevents lifting of the front end of the rear frame in the event that an extremely heavy load is placed at the extreme rear end of the rear frame. Thus, when the valve 165 is in neutral position and a heavy load is placed on the extreme rear end of the main frame, tending to cause the main frame to pivot downwardly at the rear and upwardly at the front, the locked fluid in cylinder 155 will prevent such tilting.

The flexible tubes for cylinders 101 are shown diagrammatically in Fig. 16 as 169 leading to and from valve 103, and 170 leading to and from valve 104. The hydraulic pump is shown at 171, and this pump is driven by the prime mover, namely, the internal-combustion engine 27, which latter also drives the front wheels 28. The fluid reservoir is shown at 172.

A reel 175 is carried by a shaft 176 which latter is carried by the lower end of one of the legs 146 of saddle 144. Flexible tubes 166 and 170 for the hydraulic fluid, and flexible tube 111 for cylinder 110, and a flexible tube 177 for the brake system for the rear wheels, are strung over the reel 175. Reel 175 takes up the slack on these tubes when the front end of the rear section is moved from one position to another.

It will be seen that by manipulating valve 165, the front end of the rear frame 34 can be moved upwardly or downwardly, and this valve acts independently of valves 103 and 104 for the cylinders connected with the rear end of the rear frame. Also by manipulating valves 103, or 104, or both, the rear frame can be moved to any of the positions shown in Figs. 1 to 6 inclusive, including any intermediate position.

The fenders 179 are fastened to the levers 47 and moved therewith.

From the foregoing it is readily apparent that the present invention provides for the ready handling of heavy material, since the platform can be lowered to the ground level and can be raised to dock level, and this is possible regardless of whether the ground on which the truck is standing is level or not.

While the form of embodiment herein shown and described constitutes a preferred form, it is to be understood that other forms may be adopted falling within the scope of the claims that follow.

We claim:

1. A heavy load carrying vehicle including forward and rear sections, said forward section including a front frame adapted to be wheel supported and to be advanced by a motor, said rear section including a rear frame, means connecting said rear frame to the front frame for relative up and down movement of the rear frame while the rear frame remains substantially horizontal, wheels at opposite sides of the rear frame, springs mounted for bodily displacement relative to the wheels and through which a portion of rear frame imposed load is supported by the wheels, means interconnecting the springs and wheels for transmitting said portion of rear frame load to the wheels and interconnecting the rear frame and wheels for transmitting the remainder of rear frame load to the wheels, and means operable to raise the horizontally remaining rear frame including elevator means connected in rear frame supporting relation with the springs and means connecting said elevator means with the rear frame for raising the rear frame relative to the wheels, springs and elevator means in response to operation thereof while the springs remain under rear frame imposed load.

2. A heavy load carrying vehicle including forward and rear sections, said forward section including a front frame adapted to be wheel supported and to be advanced by a motor, said rear section including a rear frame, means connecting said rear frame to the front frame for relative up and down movement of the rear frame between a position of rest on the ground and a position above the wheel axes while the rear frame remains substantially horizontal, wheels at opposite sides of the rear frame, springs mounted for bodily displacement relative to the wheels and through which a portion of rear frame imposed load is supported by the wheels, means interconnecting the springs and wheels for transmitting said portion of rear frame load to the wheels and interconnecting the rear frame and wheels for transmitting the remainder of rear frame load to the wheels, and means operable to raise the horizontally remaining rear frame including elevator means connected in rear frame supporting relation with the springs and means connecting said elevator means with the rear frame for raising the rear frame relative to the wheels, springs and elevator means in response to operation thereof while the springs remain under rear frame imposed load.

3. A heavy load carrying vehicle including forward and rear sections, said forward section including a front frame adapted to be wheel supported and to be advanced by a motor, said rear section including a rear frame, means connecting said rear frame to the front frame for relative up and down movement of the rear frame while the rear frame remains substantially horizontal, tandem wheels at opposite sides of the rear frame for supporting rear frame imposed load, means connecting the rear frame to the tandem wheels for up and down rear frame movement relative thereto and through which a portion of said rear frame load is transmitted to the wheels, springs through which the remainder of said rear frame load is transmitted to the wheels, said wheels, springs and connecting means being located outside the path of said rear frame movement, and means operable to raise the horizontally remaining rear frame including elevator means connected in rear frame supporting relation with the springs and means connecting said elevator means with the rear frame for raising the rear frame relative to the wheels, springs and elevator means in response to operation thereof while the springs remain under rear frame imposed load.

4. A heavy load carrying vehicle including forward and rear sections, said forward section including a front frame adapted to be wheel supported and to be advanced by a motor, said rear section including a rear frame, means connecting said rear frame to the front frame for relative up and down movement of the rear frame while the rear frame remains substantially horizontal, wheels at opposite sides of the rear frame, springs mounted for bodily displacement relative to the wheels and through which a portion of rear frame imposed load is supported by the wheels, means interconnecting the springs and wheels for transmitting said portion of rear frame load to the wheels and interconnecting the rear frame and wheels for transmitting the remainder of rear frame load to the wheels, and means operable to raise the horizontally remaining rear frame including rearward elevator means connected in rear frame supporting relation with the springs and means connecting said rearward elevator means with the rear frame for raising the rear frame relative to the wheels, springs and elevator means in response to operation thereof while the springs remain under rear frame imposed load, and means operable independently of said rearward elevator means to raise the rear frame relative to the front frame by exerting thrust acting oppositely on the front and rear frames including forward elevator means and means connecting said forward elevator means to the rear frame for raising the rear frame relative to the front frame and forward elevator means in response to operation thereof.

5. The invention as defined in claim 4 including fluid actuated means operable at different vertical positions of the rear frame to hold its forward end against upward displacement relative to the front frame, said fluid actuated means being inoperative when said forward elevator means is operating.

6. A heavy load carrying vehicle, including forward and rear sections, said forward section including a front frame adapted to be wheel supported and to be advanced by a motor, said rear section including a rear frame, wheels at opposite sides of the rear frame in supporting relation therewith, means including a sliding channel connection connecting said rear frame to the front frame for relative up and down movement of the rear frame, springs mounted for bodily displacement relative to the wheels and through which a portion of rear frame imposed load is supported by the wheels, means interconnecting the springs and wheels for transmitting said portion of rear frame load to the wheels and interconnecting the rear frame and wheels for transmitting the remainder of rear frame load to the wheels, and means operable to raise the horizontally remaining rear frame including fluid actuated means connected in rear frame supporting relation with the springs, a sprocket carried for displacement by said fluid actuated means and a chain connected in load transmitting relation with the sprocket and rear frame for raising the rear frame relative to said fluid actuated means in response to operation thereof.

7. A heavy load carrying vehicle including forward and rear sections, said forward section including a front frame adapted to be wheel supported and to be advanced by a motor, said rear section including a rear frame, means connecting said rear frame to the front frame for relative up and down movement of the rear frame while the rear frame remains substantially horizontal, tandem pairs of ground engaging wheels at opposite sides of the rear frame for supporting rear frame imposed load, means connecting the rear frame to the tandem wheels for up and down rear frame movement relative thereto and through which a portion of said rear frame load is transmitted to the wheels, means including springs connected with said means connecting the frame to the tandem wheels and through which the remainder of said rear frame load is transmitted to the wheels, said wheels, springs and connecting means being located outside the path of said rear frame movement, and means operable to raise the horizontally remaining rear frame including elevator means connected in rear frame supporting relation with the springs and means connecting said elevator means with the rear frame for raising the rear frame relative to the wheels, springs and elevator means in response to operation thereof while the springs remain under rear frame imposed load.

8. The invention as defined in claim 7 comprising rearward elevator means, and including means operable independently of said rearward elevator means to raise the rear frame relative to the front frame including forward elevator means and means connecting said forward elevator means to the rear frame for raising the rear frame relative to the front frame and forward elevator means in response to operation thereof.

9. The invention as defined in claim 8 comprising fluid actuated elevator means, and a motor driven pump and separately operable valves carried by said front section and controlling fluid delivery from the pump to said elevator means.

10. A truck vehicle comprising a load carrying frame, ground engaging wheels supporting the frame at opposite sides thereof, said frame being vertically movable between the wheels from a lower position of rest on the ground to a position above the wheel axes while remaining substantially horizontal, yielding means mounetd for bodily displacement relative to the wheels and through which a portion of frame imposed load is supported by the wheels, means interconnecting said yielding means and wheels for transmitting said portion of frame load to the wheels and interconnecting the frame and wheels for transmitting the remainder of frame load to the wheels, and means operable to raise the horizontally remaining frame including elevator means connected in frame supporting relation with said yielding means and means connecting said elevator means with the frame for raising the frame relative to the wheels, yielding means and elevator means in response to operation thereof while the yielding means remain under frame imposed load.

11. A truck vehicle, comprising a load carrying frame, ground engaging wheels supporting the frame at opposite sides thereof, said frame being vertically movable between the wheels from a lower position of rest on the ground to a position above the wheel axes while remaining substantially horizontal, yielding means mounted for bodily displacement relative to the wheels and through which a portion of frame imposed load is supported by the wheels, means interconnecting said yielding means and wheels for transmitting said portion of frame load to the wheels and interconnecting the frame and wheels for transmitting the remainder of frame load to the wheels, and means operable to raise the horizontally remaining frame including elevator means connected in frame supporting relation with said yielding means and means connecting said elevator means with the frame for raising the frame relative to the wheels, yielding means and elevator means in response to operation thereof while the yielding means remain under frame imposed load, and means holding the yielding means against displacement and through which the frame is supportable by the yielding means and wheels independently of said elevator means for supporting the frame in elevated position during vehicle advancement and releasable to permit lowering of the frame from said position.

12. A truck vehicle, comprising a load carrying frame, tandem pairs of ground engaging wheels supporting the frame at opposite sides thereof, said frame being vertically movable between the wheels from a lower position of rest on the ground to a position above the wheel axes while remaining substantially horizontal, tandem pairs of arms at opposite sides of the frame each arm pair pivotally interconnecting a tandem pair of wheels with the frame forward and rearward of the wheels for up and down frame movement relative thereto and through which a portion of frame load is transmitted to the wheels, means including springs interconnecting the arms in each tandem pair and through which the remainder of frame load is transmitted to the wheels, said wheels, springs and arms being located outside the path of rear frame movement, and means operable to raise the horizontally remaining frame including fluid actuated elevators connected in frame supporting relation with the springs and means connecting said elevators with the frame for raising the frame relative to the wheels, springs and elevators in response to operation thereof while the springs remain under frame imposed load.

13. The invention as defined in claim 12 including pivots connecting the elevators with said interconnecting means accommodating displacement of the tandem wheels in vertical planes and relative to said elevators.

14. The invention as defined in claim 13 including guides interconnecting the frame and elevators and constraining them for relative movement substantially normal to the plane of said frame.

References Cited in the file of this patent

UNITED STATES PATENTS

| | | |
|---|---|---|
| 1,223,741 | Schwister | Apr. 24, 1917 |
| 1,340,418 | Schneider | May 18, 1920 |
| 1,562,872 | Davis | Nov. 24, 1925 |
| 1,771,488 | Duesler | July 29, 1930 |
| 2,050,471 | Soulis | Aug. 11, 1936 |
| 2,110,214 | Flower | Mar. 8, 1938 |
| 2,452,267 | Schramm | Oct. 26, 1948 |
| 2,475,443 | Bill | July 5, 1949 |
| 2,530,577 | Gurries | Nov. 21, 1950 |
| 2,560,625 | Bogs et al. | July 17, 1951 |
| 2,560,715 | Bill | July 17, 1951 |
| 2,636,746 | Meldrum | Apr. 28, 1953 |
| 2,648,546 | Falkenhagen | Aug. 11, 1953 |
| 2,719,726 | Johnston | Oct. 4, 1955 |